United States Patent

Mein et al.

[11] 4,085,191
[45] Apr. 18, 1978

[54] PROCESS FOR RECOVERY OF POTASSIUM FROM MANGANATE PLANT WASTES

[75] Inventors: Peter G. Mein; Horst R. Adolf, both of Peru, Ill.

[73] Assignee: Carus Corporation, LaSalle, Ill.

[21] Appl. No.: 791,005

[22] Filed: Apr. 26, 1977

[51] Int. Cl.² ............................................. C01D 1/04
[52] U.S. Cl. ...................................... 423/208; 423/50
[58] Field of Search .................. 423/49, 50, 181, 183, 423/208, 641

[56] References Cited

U.S. PATENT DOCUMENTS

| 513,001 | 1/1894 | Blackmore | 423/641 |
| 910,662 | 1/1909 | Gibbs | 423/641 |
| 1,238,916 | 9/1917 | Hoover | 423/641 |
| 1,260,944 | 3/1918 | Rody | 423/641 |
| 2,940,822 | 1/1960 | Carus et al. | 423/641 |
| 3,172,830 | 3/1965 | Carus | 423/50 |

FOREIGN PATENT DOCUMENTS 2,023,024  11/1970  Germany ........................... 423/49

Primary Examiner—O. R. Vertiz
Assistant Examiner—Wayne A. Langel
Attorney, Agent, or Firm—Tilton, Fallon, Lungmus & Chestnut

[57] ABSTRACT

Potassium is recovered as a dilute KOH solution from residue solids resulting from conversion of manganese ore to $K_2MnO_4$ by reacting the solids with a $Ca(OH)_2$ under specified conditions. The resulting KOH solution can be returned to the $K_2MnO_4$ plant and the solids of reduced potassium content are suitable for disposal in a landfill.

7 Claims, 1 Drawing Figure

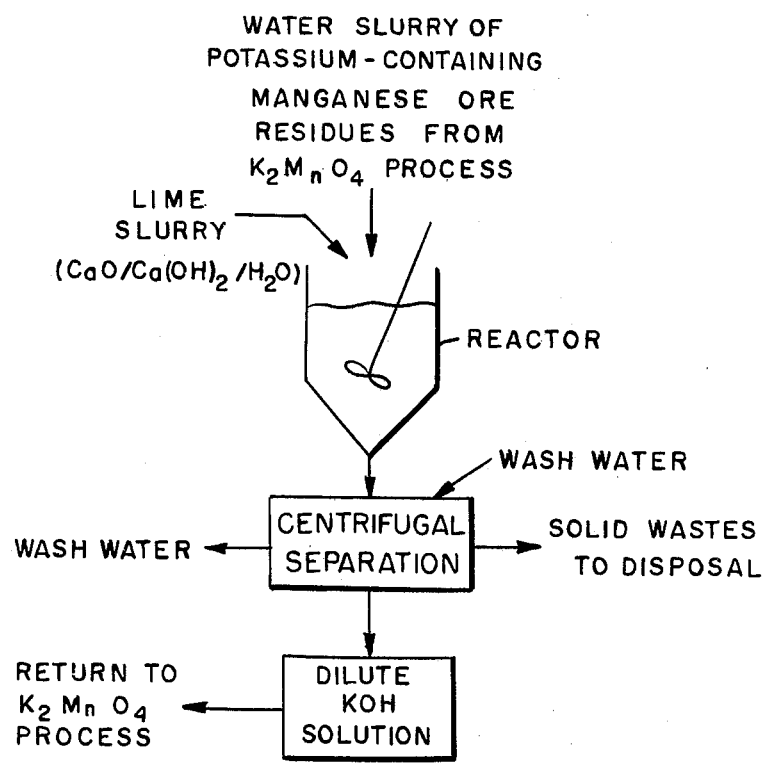

PROCESS FOR RECOVERY OF POTASSIUM FROM MANGANATE PLANT WASTES

BACKGROUND

Potassium permanganate ($KMnO_4$) is produced from manganese ore in two stages. In the first stage, manganese dioxide is reacted with potassium hydroxide and oxygen to produce manganate VI. In the second stage, the manganate VI is electrolytically oxidized to potassium permanganate. These two oxidizing stages can be represented by the following equations:

$$MnO_2 + 2KOH + \tfrac{1}{2}O_2 \rightarrow K_2MnO_4 + H_2O \quad (1)$$

$$K_2MnO_4 + H_2O \xrightarrow{electr.} KMnO_4 + KOH + \tfrac{1}{2}H_2 \uparrow \quad (2)$$

The plant operation for producing manganate VI involves the separation of the manganate VI from the ore residue. The impure $K_2MnO_4$ containing the ore residue is extracted with dilute KOH solution to dissolve the manganate VI while leaving the ore residue undissolved. Prior to the present invention, the residue solids were separated from the extracted $K_2MnO_4$, and the solids were disposed of as waste. Because of a high content of potassium they could not be disposed of as solid waste, such as in a landfill. The potassium content was objectionable for landfill purposes, since although the potassium was not readily soluble, it would gradually be released under the action of rain and ground water, resulting in undesirable contamination of the ground water. In prior practice, the semi-liquid waste was transferred to a lagoon in which the solids were permitted to settle, and the liquid to overflow into a stream, which was not satisfactory from the standpoint of avoiding stream pollution. A better method for preparing the manganate ore waste for disposal has therefore been needed, especially one which would reduce the potassium content of the waste. The process of the present invention accomplishes this purpose, while at the same time producing a dilute solution of KOH which can be returned to the manganate VI plant, and the remaining solid waste material can be disposed of in a landfill.

An industrial process for recovery and purification of manganate VI is described in U.S. Pat. No. 3,172,830. In that process, the manganate ore residue is separated from the extracted $K_2MnO_4$ together with $CaCO_3$ and $Ca(OH)_2$. The calcium carbonate and calcium hydroxide are present because of a causticizing treatment of the supernatant from the manganate VI crystallizer. More specifically, the supernatant from the crystallizer contains soluble potassium salts, principally potassium carbonate but also some potassium silicate and potassium aluminate. By treating the supernatant solution with calcium hydroxide, the potassium salts are converted to potassium hydroxide and the corresponding calcium salts are precipitated, including the calcium carbonate, silicate, and aluminate. Excess calcium hydroxide will also be precipitated, being thrown out of solution by the potassium hydroxide. The solubility of calcium hydroxide decreases rapidly as the concentration of potassium hydroxide increases.

SUMMARY OF INVENTION

Potassium-containing residue solids resulting from conversion of manganese ore to $K_2MnO_4$ are reacted in the form of an aqueous slurry of partially dissolved $Ca(OH)_2$. By using from 2 to 5 mols of Ca per mol of K in the solids, and limiting the concentration of the KOH formed in the slurry to less than 50 grams KOH per liter of water, from 50 to 70% or more of the K in the residue solids can be solubilized and recovered as a dilute solution of KOH. The exact mechanism of the potassium recovery is not known but it appears to involve an ion exchange reaction.

Based on the results of the experiments leading to the present invention, it now appears that most if not all of the potassium associated with the waste is held by compounds capable of undergoing ion exchange reactions. The compounds may possibly be alumino-silicates and delta manganese dioxide. Alumina silicates are derived from the ore gangue, and delta manganese dioxide is formed by hydrolysis of potassium manganate VI. Further, both of these compounds have ion exchange properties. Moreover, the required reaction conditions suggest an ion exchange mechanism.

A large excess of Ca over K favors the desired reaction, while the reaction is inhibited with increasing concentrations of KOH in the water. By employing at least two mols of Ca per mol of K in the residue solids, and limiting the concentration of KOH in the water to less than 50 grams per liter, at least 50% or more of the K in the residue solids can be solubilized as KOH. Under the preferred conditions, of at least 2.5 mols of Ca per mol of K and less than 35 grams KOH per liter of water, from 70 to 90% of the K can be recovered. Further, although the product is a very dilute KOH solution, it can be returned to the manganate VI process, as will subsequently be described in detail, and the separated reacted solids can be disposed of by burying them in a landfill.

DRAWING

The accompanying drawing is a diagrammatic flow sheet of an embodiment of the K-recovery process of the present invention.

DETAILED DESCRIPTION

The starting material for the process of the present invention can be described as potassium-containing residue solids resulting from conversion of manganese ore to $K_2MnO_4$ by reacting the ore with KOH and $O_2$. The residue solids may also contain calcium carbonate and calcium hydroxide. See U.S. Pat. No. 3,172,830, the disclosure of which is incorporated herein by reference. As described in the cited patent, the crude $K_2MnO_4$ is leached with an aqueous KOH solution, which preferably contains from 60 to 100 grams per liter KOH. Commercially, the leached solution usually contains from 10 to 15% KOH. The leaching step dissolves the manganate VI, leaving the insoluble ore impurities behind. Any excess calcium hydroxide carrying over from the causticizing treatment of the crystallizer supernatant is largely precipitated due to the concentration of the KOH, and the solids separated by filtration from the leach liquor comprise the ore impurities, the precipitated calcium hydroxide, and also calcium carbonate. The filter cake may contain from 55 to 75% water. In a preferred embodiment of the present invention, this filter cake is further processed to recover the potassium, which may comprise from 6 to 9% by weight on a dry basis of the filter cake solids. Based on commercial operation of the process of U.S. Pat. No. 3,172,830, the residue solids comprising the filter cake are represented by the following chemical composition:

Mn : 15-22%
Ca : 12-16%
Fe : 6-12%
K : 6-9%
Si : 3-5%
Al : 3-5%
Ba : 1-2%

Most of the constituents of the waste filter cake are derived from the gangue portion of the manganese ore. Some of the Mn and part of the K are probably hydrolysis products of potassium manganate VI, and some Si (in the form of $SiO_2$) is sometimes added to the system to improve filterability of the solid waste. It appears likely that most of the potassium is attached to the silica-alumina portion of the ore gangue. As previously explained, the presence of calcium is due to the use of calcium hydroxide as the causticizing chemical, according to the procedure described in the cited U.S. Pat. No. 3,172,830. It should be understood, of course, that the exact composition of the waste will vary with the gangue content of the ore used. However, the variation and the exact composition of the manganese ore residue solids does not affect the applicability of the process of the present invention, providing the Ca content of the $CaO/Ca(OH)_2$ is applied in relation to the K content of the waste material.

In practicing the present invention, it is desirable to routinely analyze samples of the residue solids for potassium content. This can be done conveniently by flame photometric analysis. For example, a commercially available flame spectrophotometer can be used. See Vogel, *Text-Book of Quantitative Inorganic Analysis*, Chap. XIV, pages 879–889 (3rd ed.)

Having determined the K-content of the residue solids, the amount of $CaO/Ca(OH)_2$ reactant can readily be calculated. In general, from 2 to 5 mols of total Ca should be used per mol of K in the solids. The preferred amount is from 2.5 to 4.0 mols of Ca per mol of K.

It is believed that the desired reaction can be represented by the following general equation:

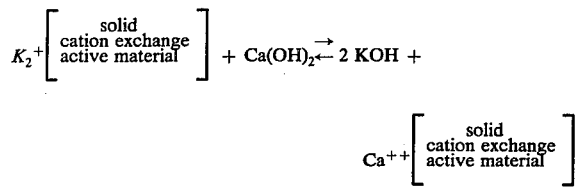

As previously indicated, the exact nature of the solid cation exchange material is not known with certainty. It may include alumina-silicates and delta managanese dioxide. The above equation also helps to explain why the K-recovery is sensitive to higher KOH concentrations in the liquid phase. Calcium hydroxide is very insoluble in the presence of KOH, even in dilute KOH solutions. Therefore, the rate of the reaction is progressively reduces as the KOH concentration in the liquid phase increases. However, by maintaining the KOH concentration in the liquid phase below 50 grams KOH per liter of water, and preferably below 35 grams KOH per liter, the recovery of K on a plant basis becomes practical.

In practicing the K-recovery process of the present invention, the residue solids are reacted in the form of a slurry. Water must therefore be added to the filter cake residue from the manganate VI process, which will usually contain only 55 to 70% water. Sufficient water should be added to permit the residue solids to be mixed or pumped, if needed. On a total water basis, the slurry of the residue solids may contain from 5 to 15 parts by weight of water per part of dry solids. This amount of water includes the water present in the filter cake, water added to the filter cake, and also any water introduced with the lime slurry.

If desired, the residue filter cake may be mixed with water in a repulper to form a slurry before it is mixed with the lime reagent. With this arrangement, the slurry of the residue solids can be introduced into a reactor together with the lime slurry. The attached flow sheet illustrates the general procedure. The reactor is provided with an agitator, as indicated, to maintain the residue solids in suspension, as much as possible, and thereby bring them into intimate contact with the calcium hydroxide reactant. The lime slurry will contain dissolved $Ca(OH)_2$ and the undissolved $Ca(OH)_2$, which will gradually dissolve as the calcium in solution replaces the adsorbed K (when CaO is added to water it forms $Ca(OH)_2$ which dissolves to the limit of its solubility.) After the reaction has been carried as far as desired, and at least 50% of the K has been solubilized as KOH, the reacted solids of the slurry are separated from the dilute KOH solution. The separation is preferably carried out by centrifugation, as indicated in the accompanying flow sheet. The liquid comprising the dilute KOH solution from the centrifugal separation can be returned to the $K_2MnO_4$ process, as indicated in the flow sheet. The solids before disposal are preferably washed with water to remove retained KOH. This wash water may also be returned to the $K_2MnO_4$ process. For example, the centrifugate, comprising the dilute KOH solution, may be returned to the causticizer, and the wash water may be used as filter wash water in the process (See U.S. Pat. No. 3,172,830, causticizer 11 and filter 5.) This will reduce the amount of water which would otherwise be added to the $K_2MnO_4$ process, and also conserve KOH.

The temperature of the K-recovery reaction is not critical. Temperatures ranging from about 20° to 80° C can be used. Higher temperatures increase the rate of the desired reaction, but may make it more difficult to separate the reacted solids. A preferred operating range is from 25° to 24° C. Other advantageous conditions for commercial practice include using 8 to 12 parts of total water per part of dry residue solids, 2.5 to 3.0 mols of Ca per mol of K, and limiting the final concentration of the aqueous phase to 10 to 20 grams of KOH per liter. Under these conditions, from 70 to 90% of the K can be recovered as KOH with a reaction time of 3 to 4 hours. However, depending on the reaction conditions and equipment and the desired percent of K recovery, reaction times of 2 to 16 hours can be used, although reaction times of over 6 hours will not normally be needed. It can be expected that the concentration of the centrifugate product will range from about 0.3 to 2% KOH, corresponding to 3 to 20 grams KOH per liter.

Under some conditions of operation, it may be necessary to correct for the presence of sodium in the residue. Presently, the residue filter cake from the manganate VI plant contains negligible sodium. However, traces of sodium are present, and will be solubilized with the potassium in the recovery plant. The return of the dilute KOH solution to the manganate VI plant may therefore gradually increase the circulating load of sodium, so that the filter cake residue will contain appreciable amounts of sodium in addition to potassium. For accuracy in practicing the present invention, therefore, any sodium present in the residue solids should be counted as potassium in determining the mols of Ca to be used. This is necessary because the calcium will exchange for the sodium as well as the potassium.

This invention is further illustrated by the following examples:

EXAMPLE 1

100 g of washed waste filter cake from the $K_2MnO_4$ plant, containing 9.97 g of potassium, was slurried with 1000 ml water. Then 40 g of CaO was added to the slurry giving a molar ration of Ca:K of 2.75:1. The total mixture was agitated for 16 hours at ambient temperature (20–30° C.). After filtering off the solids and washing the cake, the combined filtrate and wash water contained a total of 8.26 g dissolved K. The recovery of K calculates to 82.9%.

EXAMPLE 2

74.56 kg washed waste filter cake from the $K_2MnO_4$ plant, containing 5.90 kg potassium, was slurried in 855 l water. Then 23.5 kg of dry CaO was added and the total mixture agitated for 2 hours at a temperature of 37° C. The molar ration of Ca:K was about 2.78:1. After centrifuging off the solids and washing the cake, the combined filtrate and wash waters contained a total of dissolved 5.4 kg K. The recovery of K calculates to 90.8%.

EXAMPLE 3

The washed waste filter cake from the $K_2MnO_4$ process filter, containing about 1.2% K, is slurried with water in a repulper vessel to give a suspension containing 8–12% solids. A continuous stream of this slurry (at a rate of 40 gal/min) is pumped into the potassium recovery reactor, a 13,000-gallon vessel equipped with an efficient agitator and a provision for steam heating. Also continuously added to this reactor is a slurry of 15 to 20% lime (CaO) in water at a rate of 1 gal/min. Part of the CaO is in the form of dissolved $Ca(OH)_2$. The average amount of Ca:K is about 2.9:1 on a molar basis. The temperature in the K-recovery reactor is maintained from 35° to 40° C. The average retention time of the liquid suspension in the reactor is about 4 hours. Portions of the reactor contents are periodically removed and centrifuged. The centrifuge, containing typically 0.20–0.25% dissolved potassium is returned to the process via the causticizer. The wash waters from the centrifuge cake with 0.05–0.07% dissolved potassium are used for washing new waste filter cake. The centrifuge cake —after washing— is deposited in a landfill. The overall potassium recovery is 88–90.

We claim:

1. The process of recovering potassium from potassium-containing residue solids resulting from conversion of manganese ore to $K_2MnO_4$ by reacting the ore with KOH and $O_2$, comprising:

(a) reacting an aqueous slurry of said residue solids with dissolved $Ca(OH)_2$ in the presence of undissolved $Ca(OH)_2$, from 2 to 5 mols of total Ca being used per mol of K in said solids, any Na present in said solids being counted as K in determining the mols of Ca to be used;

(b) continuing said reaction until at least 50% of the K in said residue solids has been solubilized as KOH while limiting the concentration of said KOH to less than 50 grams KOH per liter of water; and (c) separating the resulting KOH solution from the reacted solids.

2. The process of claim 1 in which from 2.5 to 4.0 mols of Ca are used per mol of K.

3. The process of claim 1 in which said reaction is continued until at least 70% of the K in said residue solids has been solubilized.

4. The process of claim 1 in which said KOH concentration is limited to less than 35 grams KOH per liter of water.

5. The process of recovering potassium from potassium-containing residue solids resulting from conversion of manganese ore to $K_2MnO_4$ by reacting the ore with KOH and $O_2$, comprising:

(a) reacting an aqueous slurry of said residue solids with dissolved $Ca(OH)_2$ in the presence of undissolved $Ca(OH)_2$, from 2 to 5 mols of total Ca being used per mol of K in said solids, any Na present in said solids (b) continuing said reaction until at least 70% of the K in said residue solids has been solubilized as KOH while limiting the concentration of said KOH to less than 35 grams KOH per liter of water; and (c) separating the resulting KOH solution from the reacted solids.

6. The process of claim 5 in which said KOH concentration on the completion of said reaction is within the range from 5 to 20 grams KOH per liter of water.

7. The process of recovering potassium from potassium-containing residue solids resulting from conversion of manganese ore to $K_2MnO_4$ by reacting the ore with KOH and $O_2$, comprising:

(a) reacting an aqueous slurry of said residue solids with dissolved $Ca(OH)_2$ in the presence of undissolved $Ca(OH)_2$, from 2.5 to 4.0 mols of total Ca being used per mol of K in said solids, any Na present in said solids being counted as K in determining the mols of Ca to be used, said reaction being carried out at a temperature of 25° to 45° C and with from 5 to 15 parts by weight of water per part of said residue solids;

(b) continuing said reaction until at least 70% of the K in said residue solids has been solubilized as KOH while limiting the concentration of said KOH to less than 35 grams KOH per liter of water; said KOH concentration on completion of said reaction being within the range from 5 to 20 grams KOH per liter of water; and (c) separating the resulting KOH solution from the reacted solids.

\* \* \* \* \*

UNITED STATES PATENT OFFICE
CERTIFICATE OF CORRECTION

Patent No. 4,085,191  Dated April 18, 1978

Inventor(s) Peter G. Mein and Horst R. Adolf

It is certified that error appears in the above-identified patent and that said Letters Patent are hereby corrected as shown below:

Col. 6, line 30 after "said solids" add --being counted as K in determining the mols of Ca to be used;--

Signed and Sealed this

Fifth Day of September 1978

[SEAL]

Attest:

RUTH C. MASON
*Attesting Officer*

DONALD W. BANNER
*Commissioner of Patents and Trademarks*